(No Model.)
A. H. STODDARD.
VULCANIZING APPARATUS.
No. 447,480. Patented Mar. 3, 1891.
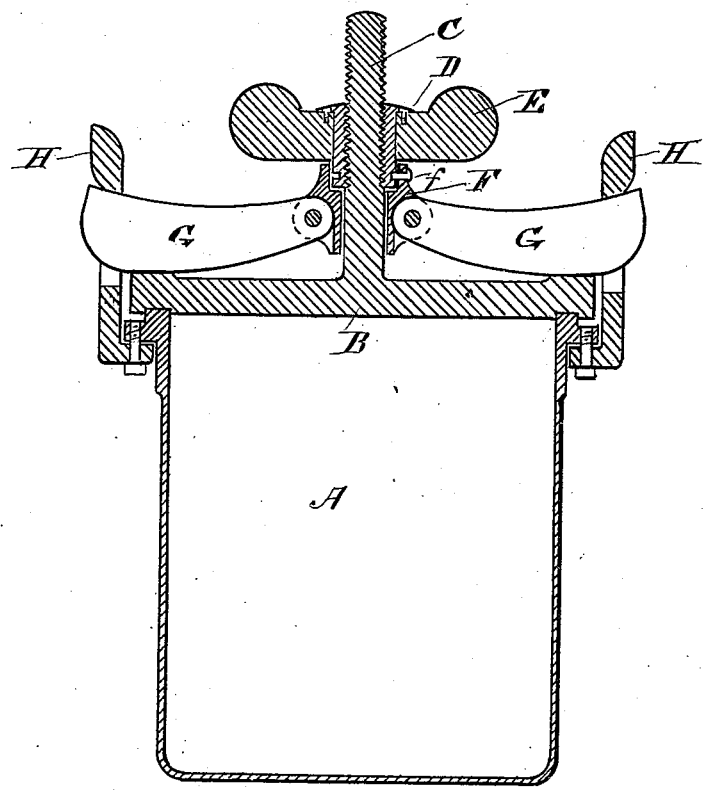
Witnesses
Ellen B. Tomlinson
John H. Taylor
Inventor
Arthur H. Stoddard
By Alex. P. Browne
attorney

UNITED STATES PATENT OFFICE.

ARTHUR H. STODDARD, OF BOSTON, MASSACHUSETTS.

VULCANIZING APPARATUS.

SPECIFICATION forming part of Letters Patent No. 447,480, dated March 3, 1891.

Application filed November 15, 1890. Serial No. 371,510. (No model.)

*To all whom it may concern:*

Be it known that I, ARTHUR H. STODDARD, of Boston, in the county of Suffolk and State of Massachusetts, a citizen of the United States, have invented a new and useful Improvement in Vulcanizing Apparatus, of which the following is a specification.

My invention relates to improvements in the construction of the flasks in which rubber goods, and particularly dental goods, are vulcanized, and its object is to improve the simplicity and effectiveness of these structures.

In the drawing I have represented in vertical section a device embodying my present invention in the form now best known to me, which device I will now proceed to describe.

In the drawing, A represents the vulcanizing-flask, and B the cover therefor, which may be of ordinary construction.

My improvement relates particularly to the devices for closing and releasing the cover B. These consist of a post C, centrally attached to the cover and threaded to receive an operating-nut D, which may be provided with a hand-wheel E of heat-insulating material. I also provide a sleeve F, surrounding the post C, but not threaded, and so connected, as by a spline and feather $f$, with the nut D that the sleeve F will rise or fall with relation to the cover as the nut D is raised or lowered upon the threaded post C.

In pivotal connection with the sleeve F, I provide a plurality of locking-levers G. Two of these, as shown in the drawing, will be generally found sufficient; but three or more may be employed, if required. The extremities of these locking-levers are arranged to slide freely through slots in posts or abutments H, connected to the vulcanizer-flask A, and the levers G bear upon the cover B, as shown. If now it be desired to lock or firmly secure the cover upon the vulcanizer-flask, this may be done by screwing down the nut D, thus forcing down the inner ends of the levers, which, acting upon the posts or abutments H as fulcra, act to force and hold the cover B tightly in place. When it is desired to open the flask, screwing up the nut D will cause the inner ends of the levers to be lifted, thus releasing the pressure of the cover upon the flask, and if the nut D be still further screwed up the levers will be drawn out of the slots in the posts H, when the cover and levers together can be readily removed.

I am aware that the broad idea of securing the top of a vulcanizer-flask by means of screw-operated clamp-levers is not new with me, and I make no claim thereto. The specific improvement, however, which I have made and shown herein presents, in my opinion, a novel, simple, and effective combination of devices for the purpose.

I claim—

1. In combination with a vulcanizer-flask A and its cover B, a threaded post centrally secured upon the cover, a nut adapted to be screwed up or down upon the said post, a sleeve surrounding the said post and so secured to the nut as to rise and fall but not revolve therewith, a plurality of locking-levers pivotally secured to the said sleeve, and posts or abutments attached to the vulcanizer-flask and slotted, as described, to receive the locking-levers, all substantially as set forth.

2. In combination, the flask A, cover B, threaded post C, nut D, insulated hand-wheel E, sleeve F, having a spline connection with the nut D, as described, locking-levers G, pivotally connected to the said sleeve, and slotted posts H, all substantially as set forth.

In testimony whereof I have hereunto subscribed my name this 11th day of November, A. D. 1890.

ARTHUR H. STODDARD.

Witnesses:
JOHN H. TAYLOR,
ELLEN B. TOMLINSON.